US007660266B2

(12) United States Patent
Ishida et al.

(10) Patent No.: US 7,660,266 B2
(45) Date of Patent: Feb. 9, 2010

(54) AUTOMATIC FUNCTIONALITY GENERATING MECHANISM FOR NETWORK CONNECTING APPLIANCES

(75) Inventors: Kiyoshi Ishida, Tokyo (JP); Kenichiro Hayashi, Tokyo (JP); Masaru Oki, Tokyo (JP); Satoshi Ebisawa, Tokyo (JP); Hiroki Suenaga, Tokyo (JP)

(73) Assignee: Internet Initiative Japan, Inc., Tokyo (JP)

( * ) Notice: Subject to any disclaimer, the term of this patent is extended or adjusted under 35 U.S.C. 154(b) by 401 days.

(21) Appl. No.: 11/556,590

(22) Filed: Nov. 3, 2006

(65) Prior Publication Data

US 2007/0106777 A1 May 10, 2007

(30) Foreign Application Priority Data

Nov. 4, 2005 (JP) ............................. 2005-321082

(51) Int. Cl.
*H04L 12/28* (2006.01)
*G06F 15/173* (2006.01)
*G06F 15/177* (2006.01)

(52) U.S. Cl. ...................... 370/254; 370/401; 709/220; 709/223

(58) Field of Classification Search ....................... None
See application file for complete search history.

(56) References Cited

U.S. PATENT DOCUMENTS

| 5,781,434 | A * | 7/1998 | Tobita et al. ............... 700/79 |
| 5,982,363 | A * | 11/1999 | Naiff ......................... 715/721 |
| 6,145,126 | A * | 11/2000 | Matsukura et al. .......... 717/173 |
| 6,381,636 | B1 * | 4/2002 | Cromer et al. ............. 709/211 |
| 6,912,582 | B2 * | 6/2005 | Guo et al. .................. 709/229 |
| 7,100,192 | B1 * | 8/2006 | Igawa et al. ................ 725/112 |
| 2001/0042113 | A1 * | 11/2001 | Cesar et al. ................ 709/221 |
| 2001/0049717 | A1 * | 12/2001 | Freeman et al. ............ 709/203 |
| 2001/0056460 | A1 * | 12/2001 | Sahota et al. ............... 709/201 |
| 2002/0013785 | A1 * | 1/2002 | Miyazaki et al. .......... 707/104.1 |
| 2002/0029256 | A1 * | 3/2002 | Zintel et al. ............... 709/218 |
| 2002/0111940 | A1 * | 8/2002 | Asai et al. .................. 707/1 |
| 2002/0124071 | A1 * | 9/2002 | Proehl et al. ............... 709/223 |
| 2002/0184387 | A1 * | 12/2002 | Yamaya et al. ............. 709/238 |
| 2003/0009542 | A1 * | 1/2003 | Kasal et al. ................ 709/222 |
| 2003/0023560 | A1 * | 1/2003 | Soma ......................... 705/51 |
| 2003/0088696 | A1 * | 5/2003 | McCanne ................... 709/238 |
| 2003/0229554 | A1 * | 12/2003 | Veres et al. ................. 705/35 |
| 2004/0148389 | A1 * | 7/2004 | Satomi et al. .............. 709/224 |
| 2004/0163101 | A1 * | 8/2004 | Swix et al. ................. 725/9 |
| 2004/0205168 | A1 * | 10/2004 | Asher ........................ 709/220 |
| 2004/0230994 | A1 * | 11/2004 | Urdang et al. ............. 725/88 |
| 2004/0246920 | A1 * | 12/2004 | Savolainen ................. 370/328 |
| 2004/0247287 | A1 * | 12/2004 | Miyazawa .................. 386/83 |
| 2004/0249788 | A1 * | 12/2004 | Dant ........................... 707/1 |

(Continued)

*Primary Examiner*—Alpus H Hsu
*Assistant Examiner*—Jessica Clifton
(74) *Attorney, Agent, or Firm*—Fish & Richardson P.C.

(57) ABSTRACT

To provide a system enabling a function for implementing providing of a service desired by an end user to be automatically generated in a network connecting appliance.

When a resource server (RS) receives a request for a specification which is desired to be implemented from a particular service adapter (SA), the requested specification is analyzed by a specification analyzing device, a virtual service adapter is formed by collecting functional modules required to implement the specification, and the formed virtual service adapter is provided for the requesting service adapter. The virtual service adapter is automatically set as a physical service adapter to implement an actually requested function in a service adapter at an end user's place.

27 Claims, 15 Drawing Sheets

U.S. PATENT DOCUMENTS

| | | | |
|---|---|---|---|
| 2005/0044265 A1* | 2/2005 | Vinel et al. | 709/238 |
| 2005/0165953 A1* | 7/2005 | Oba et al. | 709/238 |
| 2005/0166241 A1* | 7/2005 | Kim et al. | 725/81 |
| 2005/0210074 A1* | 9/2005 | Nakatani et al. | 707/200 |
| 2005/0234927 A1* | 10/2005 | Bande et al. | 707/100 |
| 2005/0259658 A1* | 11/2005 | Logan et al. | 370/392 |
| 2006/0004576 A1* | 1/2006 | Kishida | 704/258 |
| 2006/0036870 A1* | 2/2006 | Dasari et al. | 713/182 |
| 2006/0101008 A1* | 5/2006 | Asai et al. | 707/3 |
| 2006/0234685 A1* | 10/2006 | McDonough et al. | 455/414.1 |

* cited by examiner

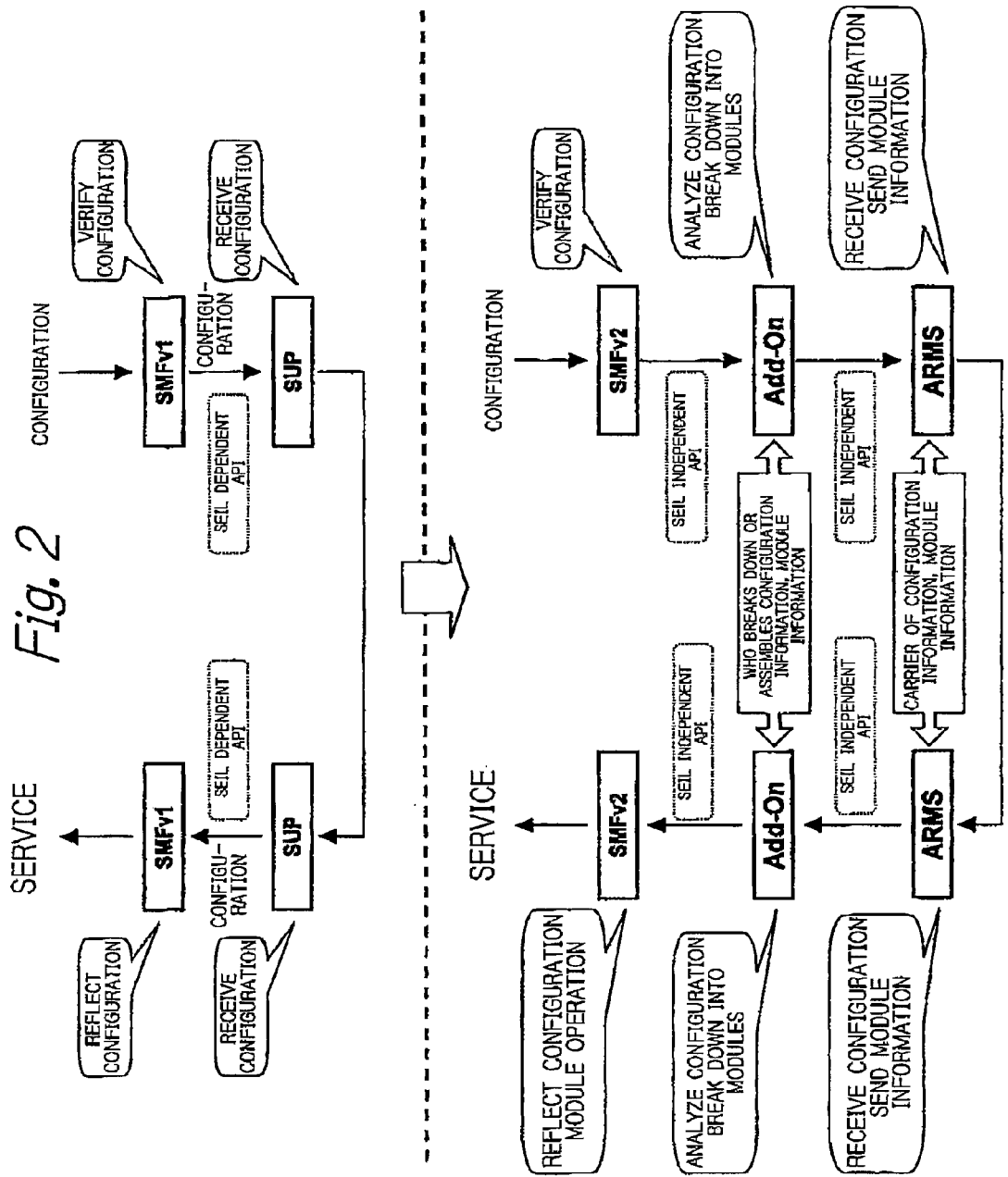

PHYSICAL SA IS PRESENT AT FIRST
SERVICE SPECIFICATION IS DETERMINED
ACCORDING TO PHYSICAL SA
→TROUBLE OCCURS WHEN PHYSICAL SA
ARRIVES LATER

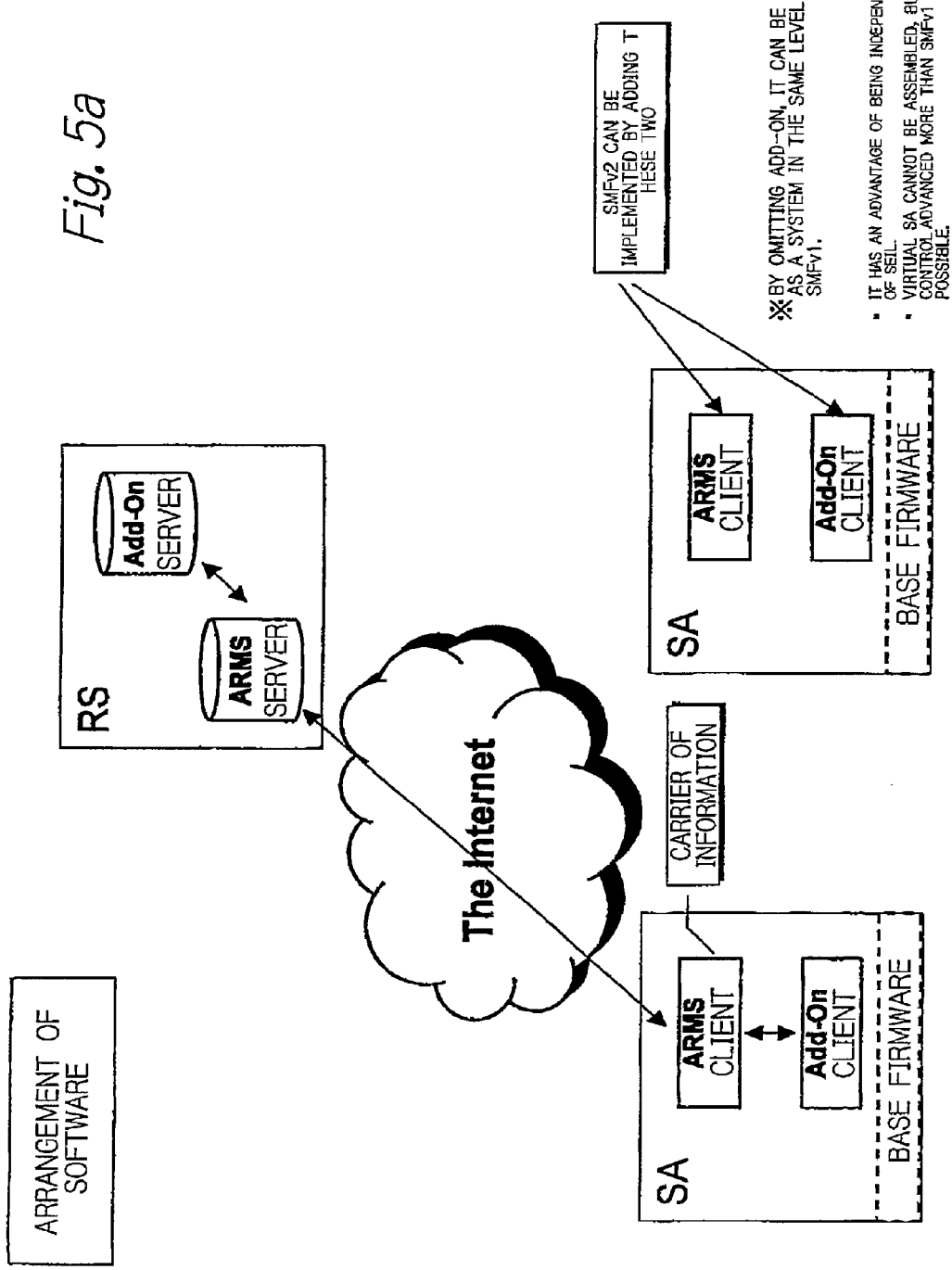

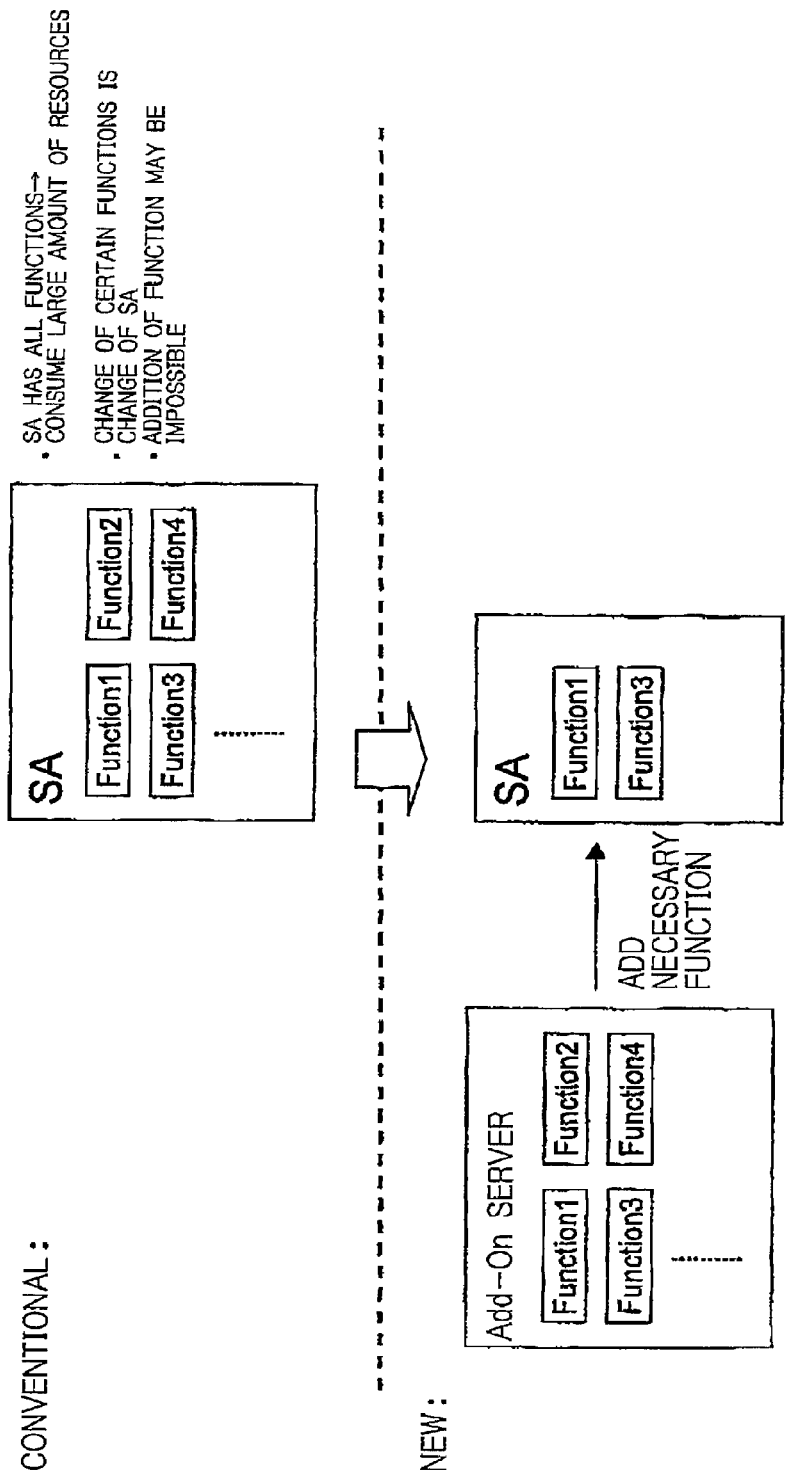

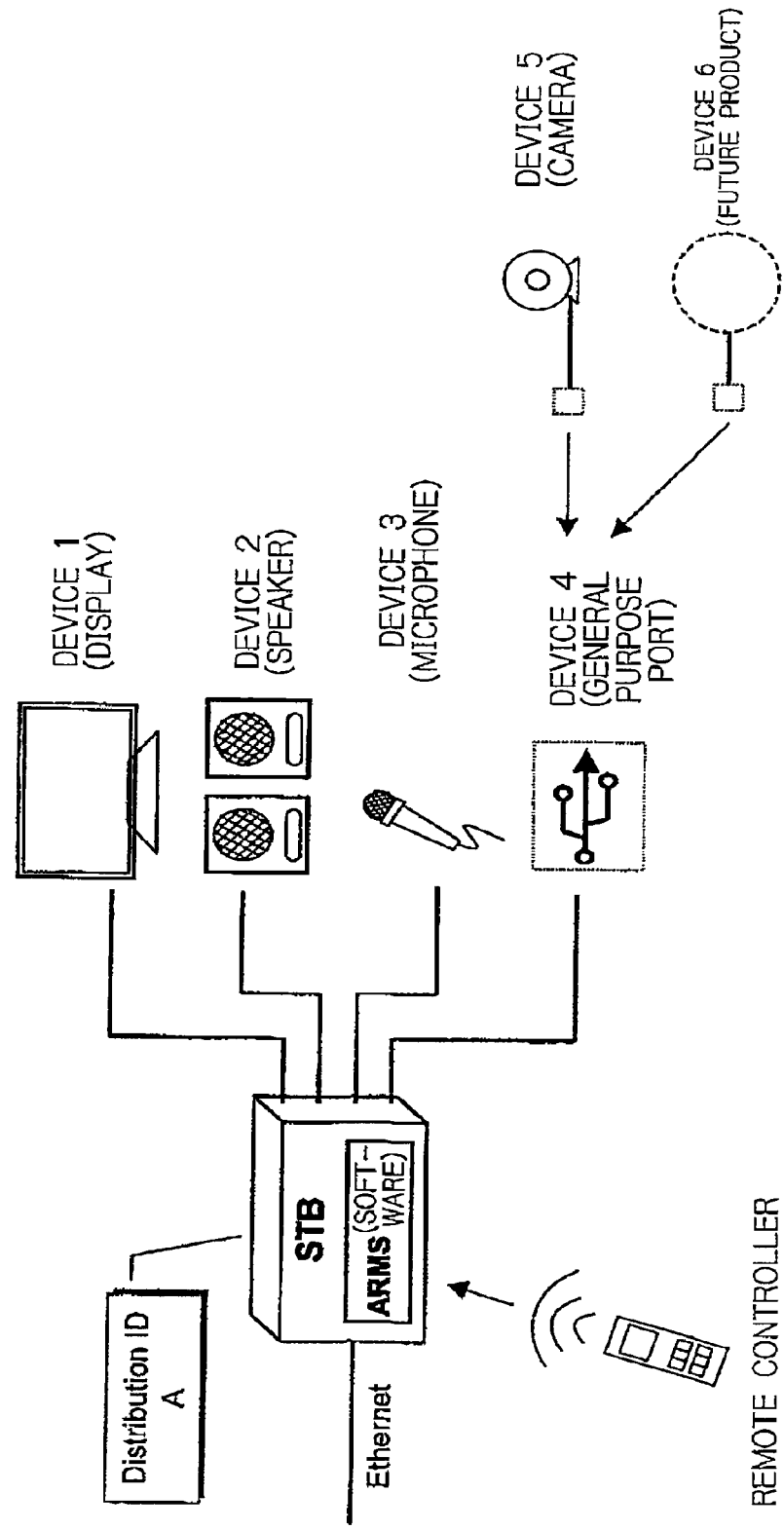

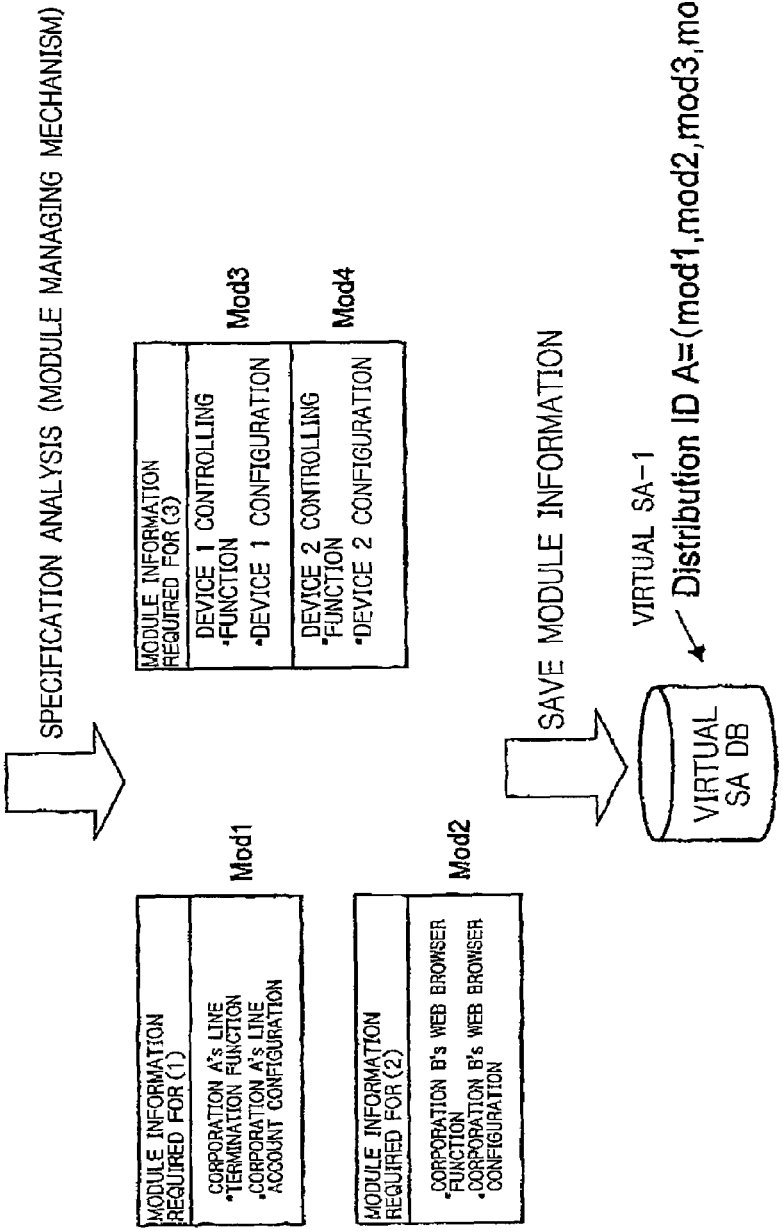

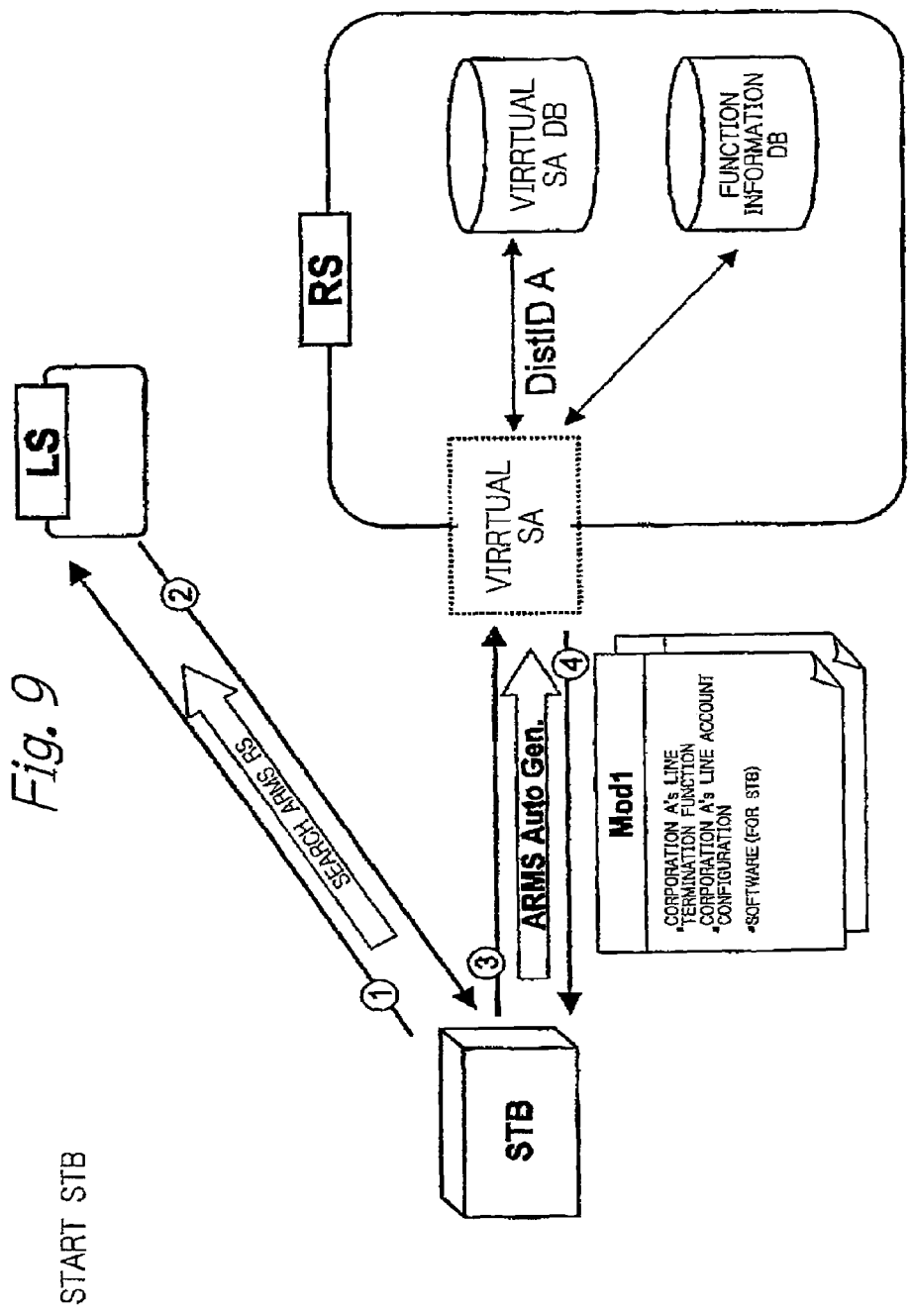

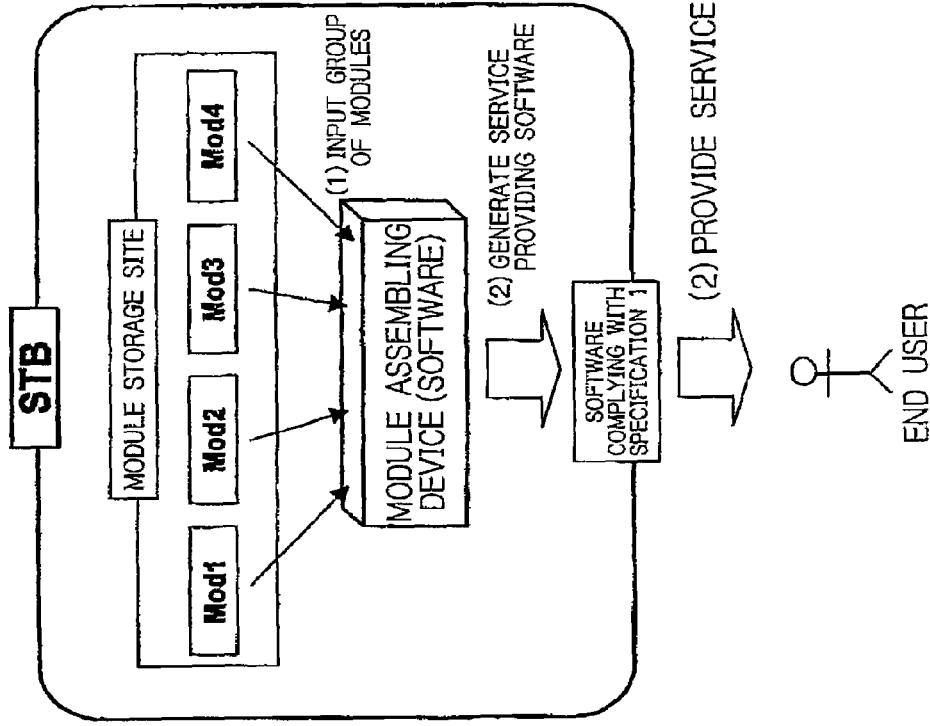

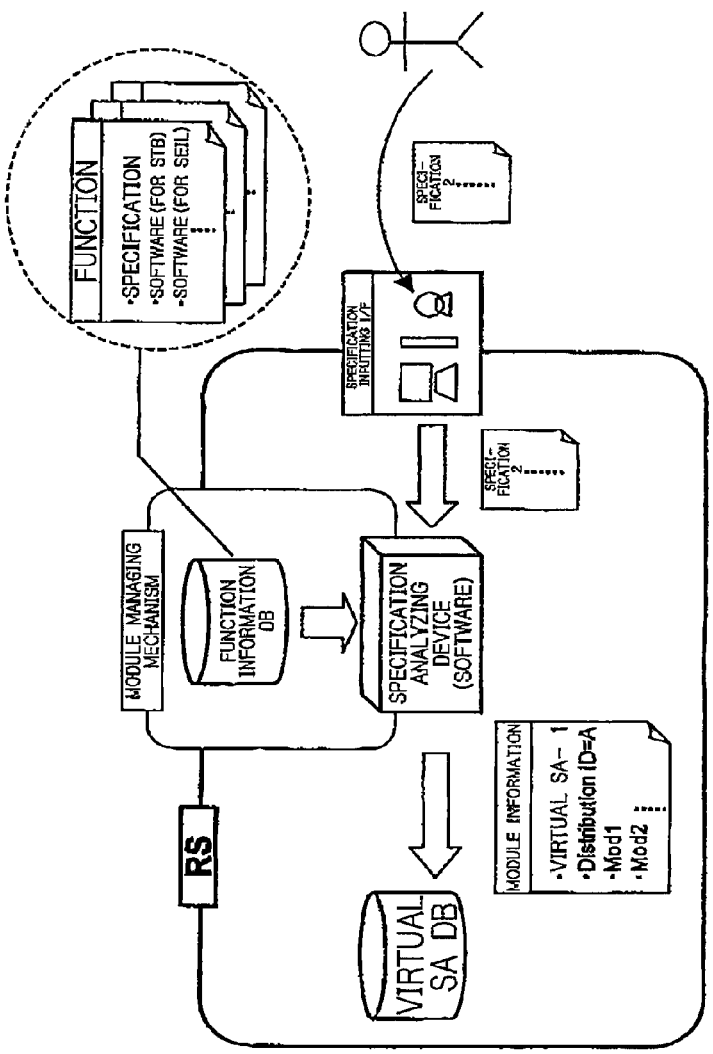

Fig. 11

CHANGE TO SPECIFICATION 2 (INTERNET TV TELEPHONE)

(1) CONNECT TO INTERNET FROM ACCESS ACCOUNT OF VoIP PROVIDER (CORPORATION C)
(2) MAKE PHONE CALL ACCORDING TO INPUT FROM REMOTE CONTROLLER
(3) INPUT SELF IMAGE FROM DEVICE 5 (CAMERA), INPUT SELF VOICE FROM DEVICE 3 (MICROPHONE), OUTPUT IMAGE OF THE OTHER PARTY ON DEVICE 1 (DISPLAY), OUTPUT VOICE OF THE OTHER PARTY TO DEVICE 2 (OUTPUT TO SPEAKER) (OUTPUT TO SPEAKER)

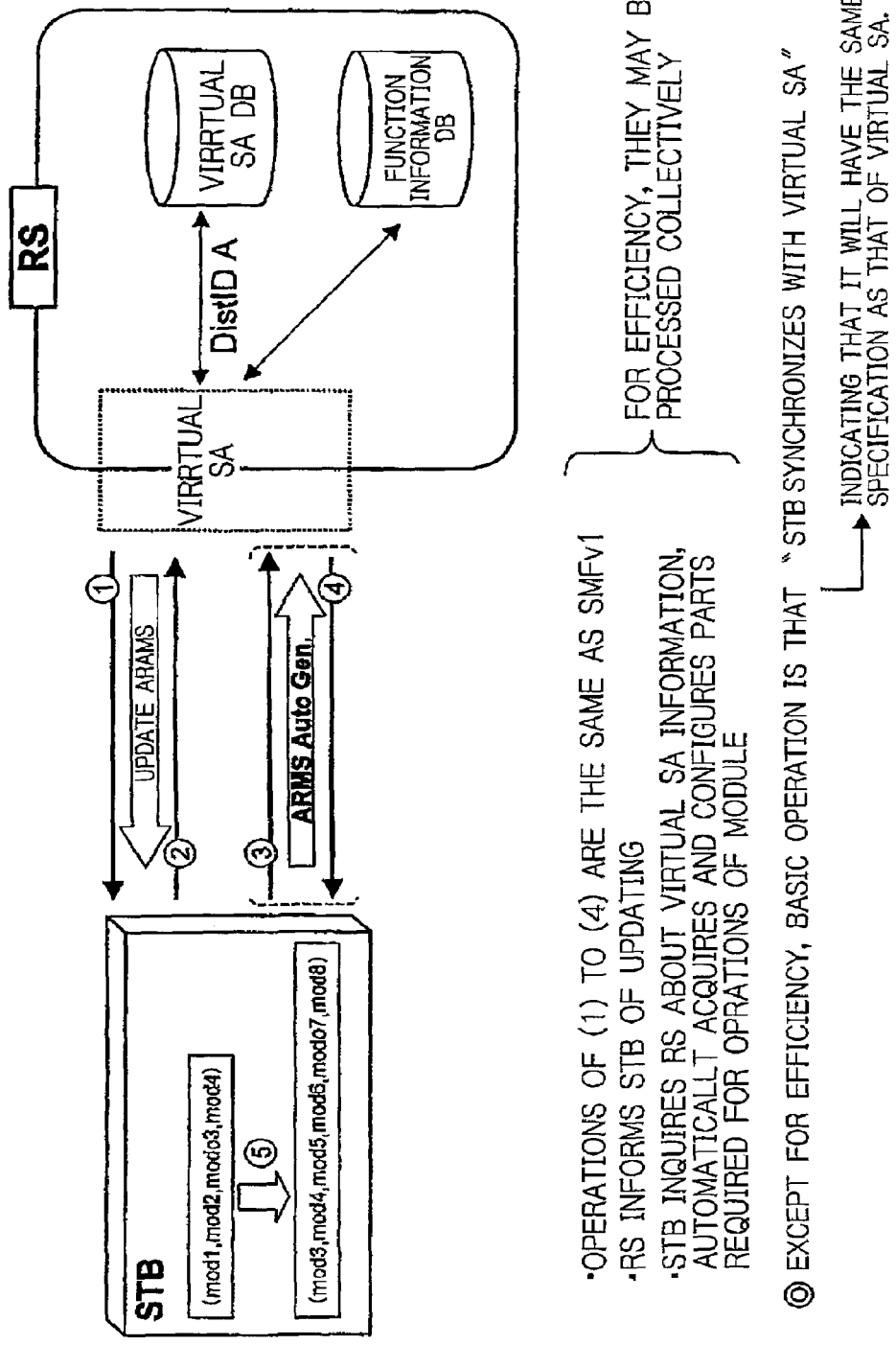

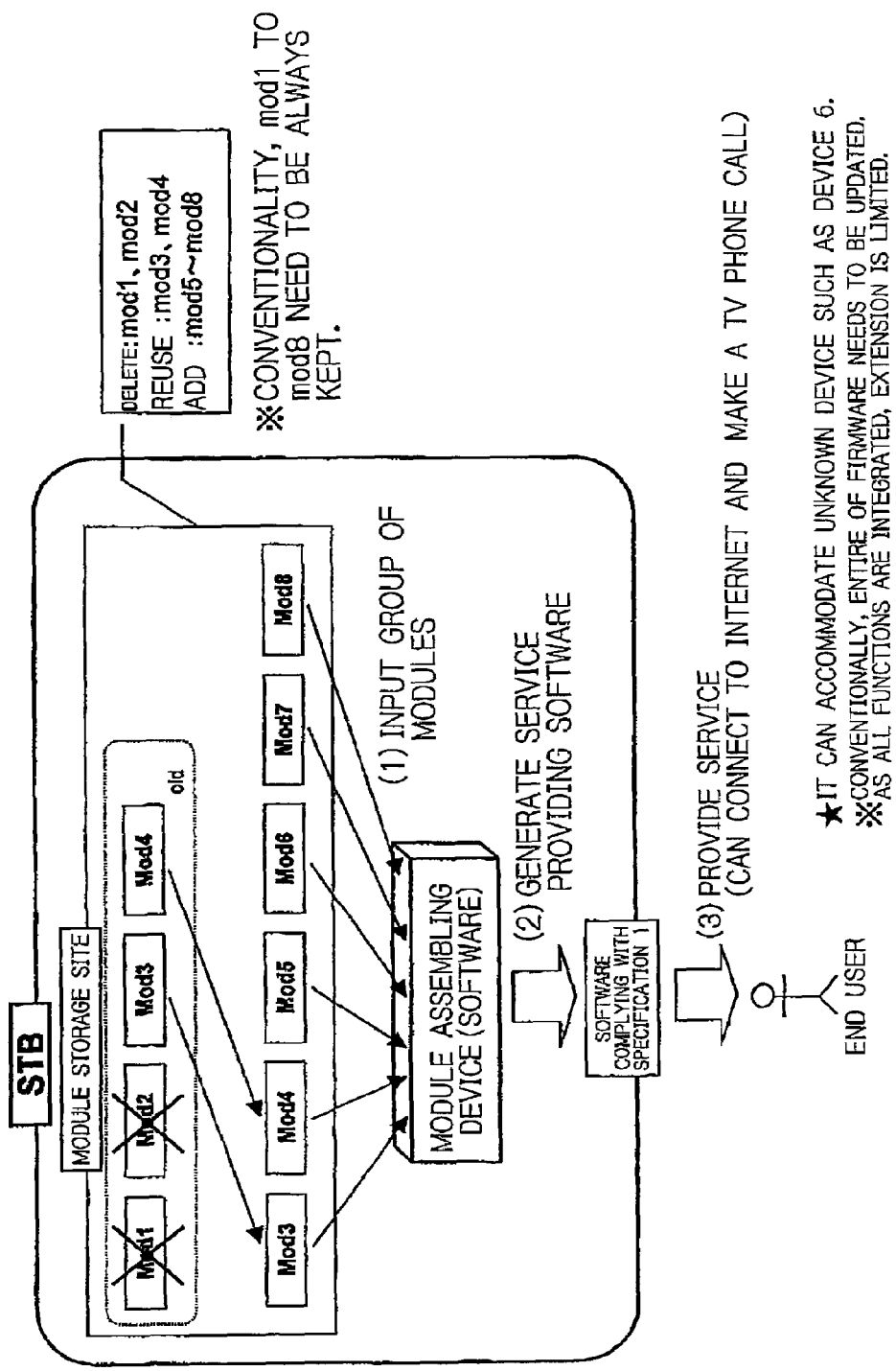

AUTOMATIC FUNCTIONALITY GENERATING MECHANISM FOR NETWORK CONNECTING APPLIANCES

BACKGROUND OF THE INVENTION

1. Field of the Invention

The present invention relates to a management and operation system for appliances connected to a network. More specifically, the present invention relates to a management and operation system which enables various functions which were not originally included in the appliances to be automatically generated from a distance according to a user's desire to use various appliances connected to a communication network.

2. Description of the Related Art

The present invention is the system and method proposed in Japanese Patent Application No. 2002-359720 titled "Central management system and method of network connecting means" filed on Dec. 11, 2002, (hereinafter simply called "a previous application") by an applicant of this patent application with improvement and new features added. Thus, the invention of the previous application will be outlined before describing the present invention.

A widely used router of these days is an apparatus for interconnecting networks and routing a packet that passes through the networks. When the router is used, for example, to connect a LAN with the Internet, both the Ethernet (registered trademark) at the LAN side and a telephone line or a dedicated line at the Internet side ere connected to terminals provided on the router. However, connecting a cable to an appropriate terminal and turning power on is not enough to operate the router; which requires a setup (configuration). That is to say, the router requires an initial configuration appropriate for each connection mode, requires modifications in the configuration after the operation starts, and must be operated with operation conditions being monitored. For that purpose, each individual router requires a specific work taking its environment into account, and that has been costly and time consuming. Specifically, to configure or maintain a router, it is a common practice, among others, for a communications engineer to login using Telnet and send a necessary configuration file to achieve the configuration. In such a conventional practice, however, an engineer with an expertise has to operate on each of a plurality of objective routers, which requires much effort.

As a solution for the abovementioned problem, the applicant of the present application has proposed a system and method for centrally managing a large number of routers in the manner below in the abovementioned Japanese Patent Application No. 2002-359720. According to the previous application, each of a plurality of routers to be managed by a router central management system has a function of connecting to an external network such as a LAS and the Internet and performs routing of data sent from the network to the LAN and the LAN to the network. Here, the LAN is a local network for connecting a large number of network terminals inside a corporation or a public body, for example.

For the router central management system, two types or servers with different functions such as an initial server and a user server are provided. In this configuration, consider a case where a router is to be newly used as an apparatus to connect the LAN with the network. At the factory shipment, only connection data for the initial server is written on the storage device (not shown) in the router as well as general data relating to security such as encryption or two-way authentication. To each router, an identifier (ID) for enabling unique identification such as a serial number is previously allocated. An initial database connected to the initial server has identifier data for all the routers used in the router central management system stored thereon. With such a configuration, two-way authentication or the like are performed by using, for example, encryption by SSL or SSH and an appropriate digital signature in communications between the routers and the initial server.

The router to be used is originally set to automatically access the initial server when an appropriate cable is connected to a terminal and power is turned on. When the initial server receives access from the router, it checks that it is not unauthorized access, and recognizes the accessing router by using its identifier. The server then acquires connection data (for example, URL) to a user server responsible for the management from, the initial database, and returns it to the router. The initial server serves as an operation guiding agency, so to say, for the accessing router.

When the router receives the connection data of the corresponding user server from the initial server, it accesses the user server in turn. In response to the access from the router, the user server identifies the router by using its identifier acquires configuration data necessary for the router to actually operate as a router from the user database, and sends it to the server. When the router receives configuration data from a user server, initial configuration is automatically done and an operation starts. With such an initial configuration procedure, all the initial configuration conventionally performed by directly login to the router becomes unnecessary. All the initial configuration of the router automatically completes only by simply connecting a cable thereto and turning on power.

As such, in the router central management system proposed in the previous application, a problem in a conventional art in that individual configuration is required for each router is eliminated and a large number of routers can be much more efficiently managed easily than the conventional art. Further, the route becomes operable without regard of the kind of a connecting communication line. Also, in the central management system of the router, management involving automatic environmental configuration (auto configuration), updating or configuring change of firmware, and monitoring the operation can be centrally performed for all the routers whether or not it is an Internet line or a WAN line.

In the abovementioned example, as means for connecting a plurality of networks, a router which performs routing by connecting the LAN in a corporation with a large number of geographically dispersed business locations; and the Internet or a WAN is assumed as a typical example. An object or central management by the invention disclosed in the previous application is not necessarily limited to a router as a routing apparatus. Any hardware, firmware, software or a combination of them can be centrally managed if only it is connected to a network and can be changed in configuration. For example, as an example totally different from a router, a personal computer such as a Windows (registered trademark) terminal or a Macintosh (registered trademark) terminal connected to a network, or a workstation such as a UNIX (registered trademark) terminal can be called as network connecting means in a sense that they function as a network terminal and requires some configuration, though, they are the same in that they cart be automatically set if only using a system proposed in the previous application.

SUMMARY OF THE INVENTION

Next, a basic idea of the invention relating to the current application (hereinafter referred to as the present invention) will be described. FIG. 1 shows a plurality of service adapters SA1-SA3, a location server LS, and a resource server RS, which are connected to the Internet. They correspond to routers, an initial server, and a user server in the abovementioned example. Although network connecting means are not limited to a router as described in the previous invention, as it is preferable not to limit them to a router in the present invention, a term "service adapter" is used in much more general meaning of a terminal for providing a service. The service adapter is referred to as a network connecting appliance in the attached claims. A server referred to as an initial server in a sense of accessing first is referred to as a location server (a first server in the attached claims) focusing on its function. A second server referred to as a user server is referred to as a resource server. The second server is referred to as a resource server in the present invention because the server has various resources for providing a service adapter (a second server in the attached claims). The previous invention features automatic configuration of a router. The present invention can provide various functions from a resource server to a service adapter in addition to performing automatic configuration of the service adapter. The various functions provided for the service adapter are automatically set and physically implemented. This features the present invention.

According to the present invention, a system for managing a plurality of network connecting appliances is provided. The system according to the present invention includes first and second servers which can be connected to the plurality of network connecting appliances via a network; a first database which is connected to the first server and stores relationship between an identifier of each of the plurality of network connecting appliances and the second server responsible for the network connecting appliance; a second database which is connected to the second server and stores configuration data to be provided for each of the plurality of network connecting appliances such that the configuration data can be retrieved by using an identifier of the network connecting appliance; and a third database which is connected to the second server and stores function data to be provided for each of the plurality of network connecting appliances such that the function data can be retrieved by using an identifier of the network connecting appliance. Further, (a) each of the plurality of network connecting appliances includes: first storage means storing first connection data required for connecting to the first server; means for automatically sending an identifier of the network connecting appliance to the first server by using the first connection data stored in the first storage means in response to power being turned on; means for sending an identifier of the network connecting appliance to the second server by using a received second connection data when second connection data required for connecting to the second server which is responsible for the network connecting appliance, is received from the first server, means for automatically configuring the network connecting appliance by using the configuration data when the configuration data is received from the second server; and means for implementing a virtual function included in the function data as a physical function in the network connecting appliance by using the function data when the function data is received from the second server; (b) the first server includes; means for receiving an identifier from the plurality of network connecting appliances; meant for acquiring the second connection data required for connecting to the second server responsible for a network connecting appliance identified by using the received identifier from the first database; and means for sending the acquired second connection data to the network connecting appliance that has sent the identifier, and (c) the second server includes; means for receiving an identifier from the plurality of network connecting appliances; means for acquiring configuration data to be provided for a network connecting appliance identified by using the received identifier from the second database; means for acquiring function data to be provided for a network connecting appliance identified by using the received identifier from the third database; and means for sending configuration data acquired from the second database and function data acquired from the third database to the network connecting appliance that has sent the identifiers thus, management of the plurality of network connecting appliances can be implemented.

In the system according the present invention, the second server further includes: a fourth database storing a functional module which can be provided for the plurality of network connecting appliances; specification updating interface means for updating a specification for defining a service to be implemented in a particular network connecting appliance in the plurality of network connecting appliances; and specification analyzing means for analyzing an updated new specification by using the specification updating interface means, acquiring all the functional modules for forming the new specification from the fourth database, and updating function data to be provided for the particular network connecting appliance stored in the third database by using the function data formed by the acquired functional modules.

In the system according to the present invention, each of the plurality of network connecting appliances further includes means for synchronizing function data which is physically implemented in the network connecting appliances and function data stored in the third database as a virtual function as to be provided in the network connecting appliance and physically implemented.

In the system according to the present invention, the second server further includes: configuration updating interface means for updating configuration of a particular network connecting appliance in the plurality of network connecting appliances and means for reflecting new configuration updated by using the configuration updating interface means to configuration data which is provided for the network connecting appliance stored in the second database.

In the system according to the present invention, updated data sending means for sending at least either of configuration data of the plurality of network connecting appliances stored in the second database and function data of the plurality of network connecting appliances stored in the third database to the plurality of network connecting appliances in a push type aspect at any timing without regard of the presence of access from the plurality of network connecting appliances may further be included.

In the system according to the present invention, each of the plurality of network connecting appliances further includes second storage means for storing second connection data which is required for connecting to the second server which is responsible for the network connecting appliance; and in that case, if configuration data and function data are sent from the second server and at least a network connecting appliance of the plurality of network connecting appliances is tuned off and then needs to be turned on again, the network connecting appliance which is turned on again can use the second connection data stored in the second storage means without needing to acre the second connection data for connecting to the second server which is responsible for the network connecting appliance from the first server again.

Although a configuration of the system according to the present invention has been described above, the present invention can be recognized as a method for controlling a management system of a plurality of network connecting appliances. The present invention can be recognized as a program for causing a computer to execute respective steps for forming such a method, and also can be recognized as a computer readable storage medium as such a program is stored therein.

BRIEF DESCRIPTION OF THE DRAWINGS

FIG. 2 shows a layer structure in the version 1 (above the dotted line) and a layer structure in the version 2 (below the dotted line);

FIG. 5a illustrates software placed in the resource server and the service adapter respectively in the system according to the present invention;

FIG. 5b shows a configuration in the version 1 above the dotted line and a configuration in the version 2 below the dotted line;

FIG. 6, shows an exemplary configuration of a set-top box;

FIG. 8 shows modules required to cause a service adapter to function as a browse terminal;

FIG. 9 shows an aspect of starting a set-top box;

FIG. 10 shows an internal operation after a set-top box acquired functional modules from a resource server;

FIG. 11 shows a case where a new specification is inputted into a specification inputting interface to update a specification;

FIG. 12 shows an aspect of updating a function of a set-top box; and

FIG. 13 shows arm internal operation after module information is updated in the set-top box.

DETAILED DESCRIPTION OF THE PREFERRED EMBODIMENTS

A particular embodiment of the present invention will be described below with referring the invention according to the abovementioned Japanese Patent Application No. 2002-359720 as the version 1 and the invention according to the current application as the version 2.

Figure 1:
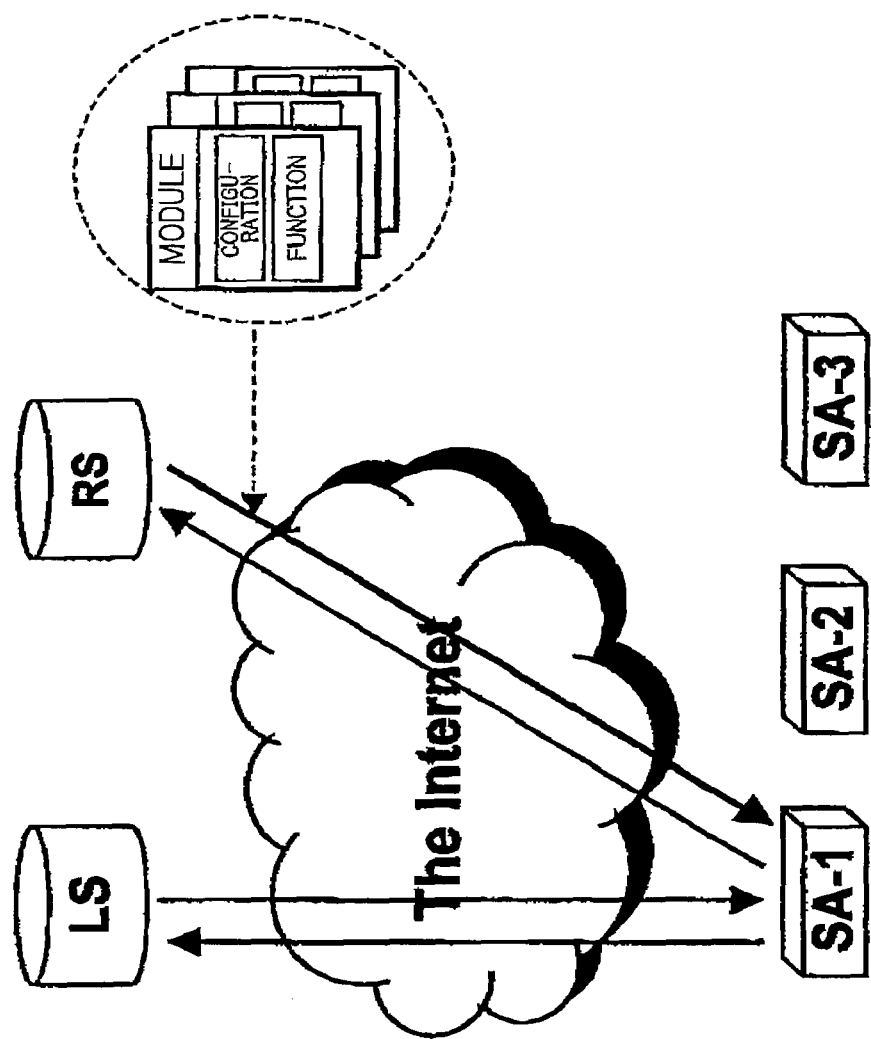
FIG. 1 shows an outline of a configuration of a system according to the present invention.

(1) Components of the System:

FIG. 1 shows an outline of a configuration of a system of the version 2 according to the present invention. A location server (LS) for providing connection data to a resource server responsible for each service adapter and a resource server (RS) for providing configuration and function for the service adapter are shown. In the system according to the present invention, only one location server is present. On the contrary, a plurality of resource servers may be present.

FIG. 2 shows a layer structure in the version 1 (above the dotted line) and a layer structure in the version 2 (below the dotted line). In the system of the version 2 according to the present invention, an Add-On client and an ARMS client are present in each service adapter. As shown in the figure, the Add-On client has a function for breaking down and integrating configuration data to or from modules. The ARMS client has a function for sending and receiving configuration information and module information.

Figure 3A:
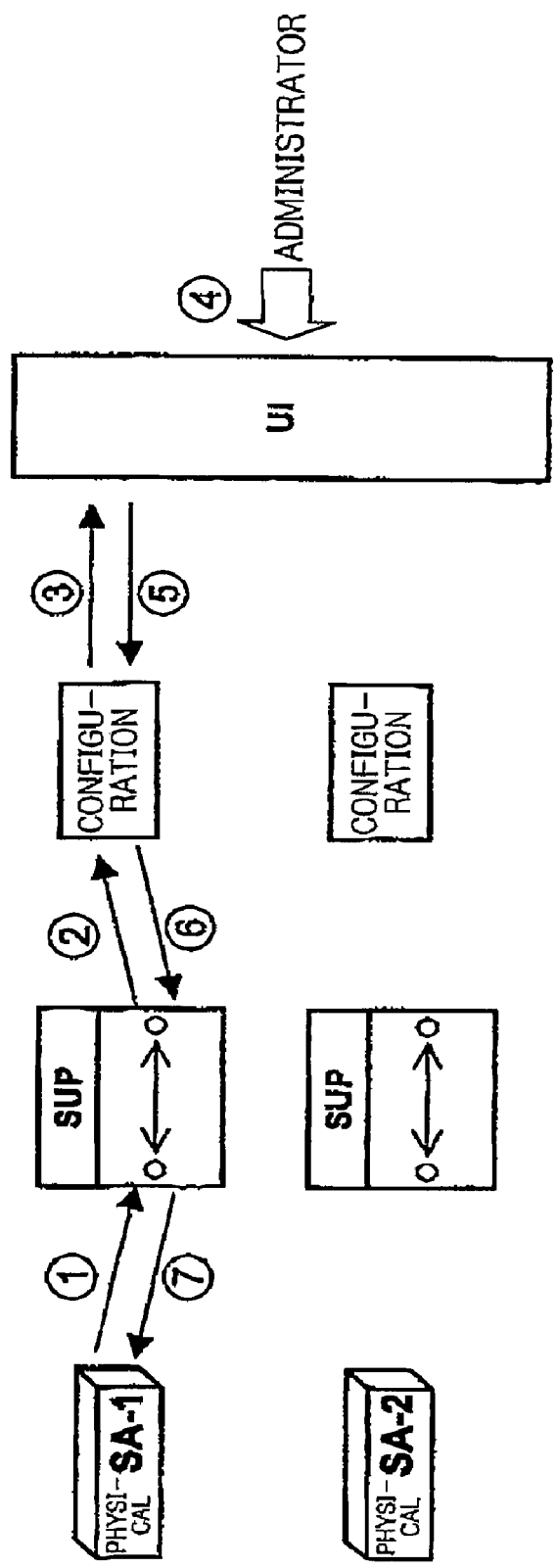
FIG. 3a illustrates configuration of a service adapter it, the version 1.
Figure 3B:
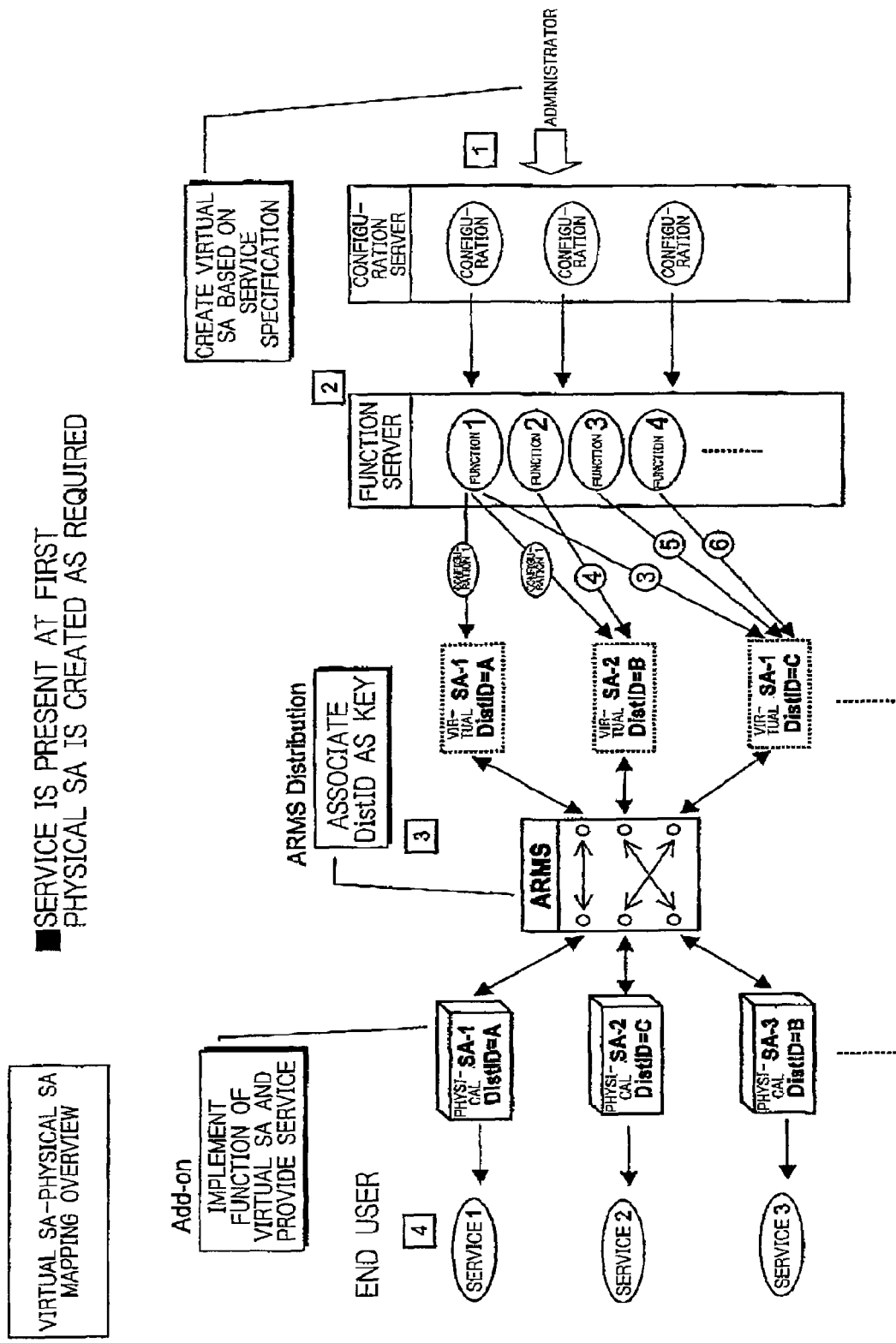
FIG. 3b illustrates implementing of configuration and function of the service adapter in the version 2.

FIG. 3a illustrates configuration of a service adapter in the version 1, and FIG. 3b illustrates implementing of configuration and function of the service adapter in the version 2.

Figure 4:
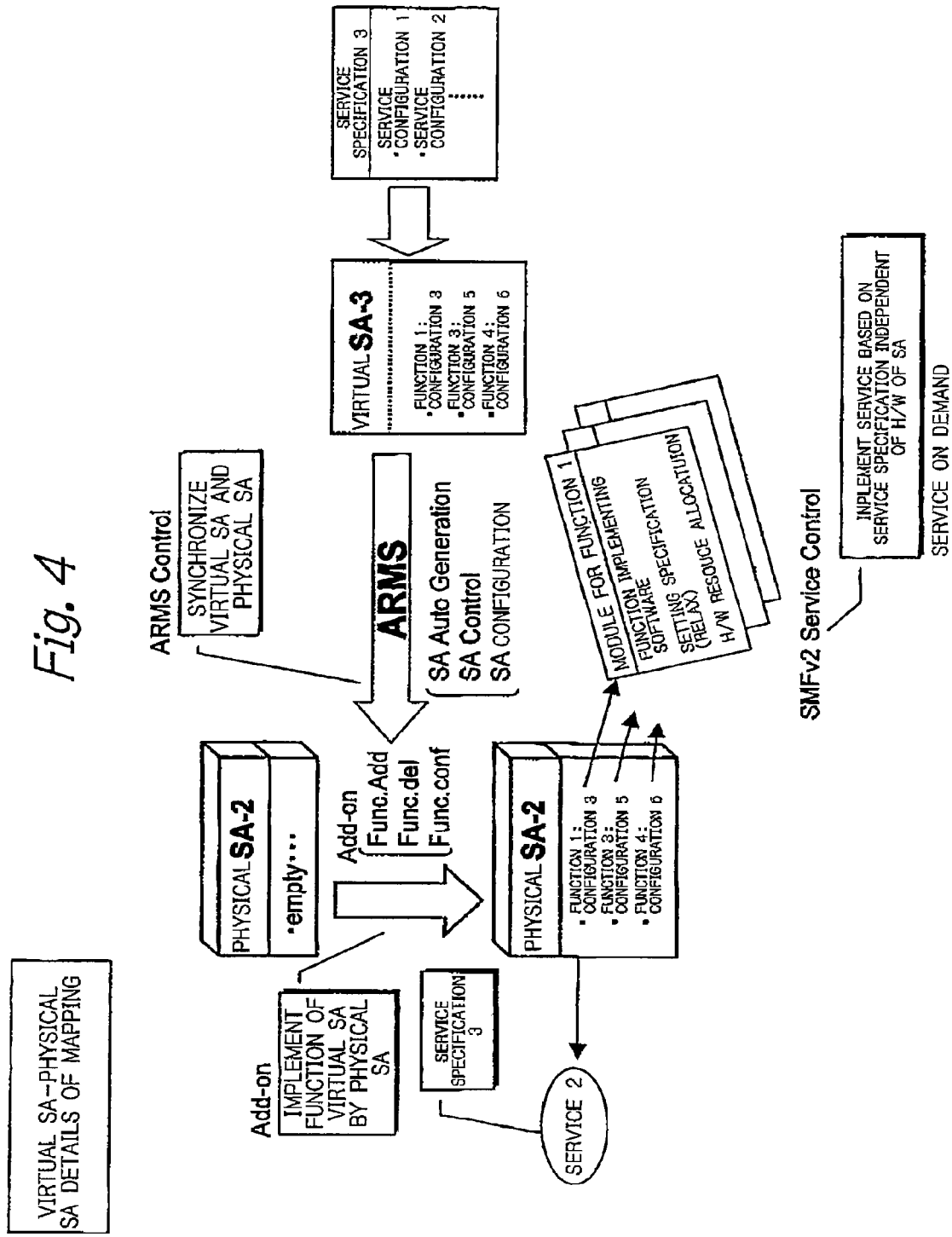
FIG. 4 shows the details of mapping between a virtual service adapter which is virtually formed at the resource server side and a physical service adapter which is physically implemented at an end user's place.

FIG. 4 shows the details of mapping between a virtual service adapter which is virtually formed at the resource server site and a physical service adapter which is physically implemented at an and user's place.

FIG. 5a illustrates software placed in the resource server and the service adapter respectively in the system according to the present invention. FIG. 5b shows a configuration in the version 1 above the dotted lire and a configuration in the version 2 below the dotted line.

(2) Chronological Ordered Operations in the System:

(2-1) Introduction:

An outline of components of a communication terminal managing system according to the present invention has been described above. Than, operations of the entire system according to the present invention will be described in a chronological order by clarifying how the above mentioned components function with reference to FIG. 6 and following figures.

(2-2) Environment:

First, an environment of the network connecting appliances managed by the system according to the present invention, which is assumed in the description below, will be described. Here, the apparatus referred to as a network connecting appliance is typically a communication terminal with an Internet connecting environment. It is referred to as a terminal, though, it may be a router. In this application, a network connecting appliance means a general appliance with an Internet connecting environment for implementing some functions. The embodiments shown in the specification and the figure are merely examples, and the present invention is not limited by the particular embodiments. A network line may be provided through the Ethernet (registered trademark), for example. It can connect to the Internet via the line. An account required to connect to the Internet is assigned to be acquired in advance. A provider of the network line and a provider of the Internet line may not be the same. As an example, it can be assumed that "Flet's ADSL" from NTT is used as the network line and "IIJ4U" from IIJ (Internet Initiative Japan, inc.) is used as the Internet line.

FIG. 6 shows a set-top box for home use and various devices connected to the set-top box as an example of a service adapter. The set-top box (STB) is a small-size computer for home use placed on a television set, for example and an appliance with less free for a user to operate than a typical personal computer, enabling various services via simple interfaces. In the description here, an infra-red radiation remote controller often used in a television set in assumed as an example of a simple interface. It is further assumed that devices below are connected to the set top boxes as shown in the figure. In the application, a term "device" is used to indicate a particular function of hardware as it is general for those skilled in the art of the present invention. For example, hardware of a television set can be considered as divided into an image outputting device, an audio outputting device, an electric wave receiving device and the like.

Next, various devices connected to the service adapter will be described. A first device is a display for outputting an image, exemplified by a television set, a CRT for a personal computer, and a liquid crystal display (LCD). A second device is a speaker for outputting sound. It may be a single speaker, or a speaker built in a television set, a CRT, or a liquid crystal display. A third device is a microphone for inputting sound. It may be a single body, or a microphone built in a camera or the like. A fourth device is a general purpose port. The general purpose port is general purpose hardware for giving an interface to a device which is not included in a set-top box as a standard. As a typical example, a USB port, an IEEE1394 port, an RS232-C port can be considered. A fifth device is a camera which is not included in the set-top box as a standard but can connect thereto via a general propose port. It is generally referred to as a Web camera. As a sixth device, it is assumed an unknown product which does not exist now but will appear in future. It is assumed that it can be connected thereto via a general purpose port.

The set-top box is assumed to include software below in advance. First, it is base firmware for providing minimum connecting functions for a network line which is supported by the set-top box. By using the connecting functions, the Internet line can be used. The base firmware also provides an operation environment for ARMS client software and Add-on client software. Here, ARMS refers to an automatic resource management system. Add-On is software for performing operations to be described below relating to configuration and updating a function. It has neither addition nor additional function other than those described above. ARMS client software provides communication by an ARMS protocol for exchanging various types of information between resource servers. It uses the Internet line with a base firmware function for the communication. This is the same as the version 1 of the previous application. The ARMS client software operates without set by a user as in the version 1. In the version 1, configuration information of a service adapter exemplified by a router or the alike is acquired. On the contrary, in the version 2, the ARMS client software acquires module information and passes the acquired module information to the Add-On client software. The Add-On client software interprets the module information and creates a software package by combining a plurality of modules. The software package provides a service equivalent to that of conventional firmware.

The set-top box includes data below in advance. First, a distribution ID which is an identifier for uniquely associating a virtual service adapter and a physical service adapter (here, a set-top box) in a system of the version 2 according to the present invention is included. Next, location server access information for the ARMS client software to access a location server immediately after it is turned on is included. Here, location information for the location serer or account information for using the Internet line are included (they are also included in firmware in the version 1).

(2-3) Inputting a Specification of Set-Top Box:

Next, inputting of specifications into the set-top box in the abovementioned environment will be described with reference to FIG. 6 and FIG. 7. Here, a specification means a role which should be played by a set-top box, and a case where a set-top box operates as a web browse terminal (specification 1) and a case where a set-top box operates as an Internet television telephone (specification 2) exemplify the specification below.

It is assumed that an end user who is using a general set-top box for a cable television or a communication karaoke at home wants to use the set-top box as a web browse terminal as the specification 1. FIG. 7 shows an outline of processes for newly inputting a specification of a web browse terminal in such a case. As shown in the figure, a specification as a web browse terminal desired by the end user is inputted into the resource server. It is as shown as a sheet with the specification 1 written thereon. There are various methods for an end user to convey a desired specification to a resource server. The end user can specify desired specification by accessing a web site which provides a list of specifications which can be provided. There may be methods which can be used by even those unfamiliar to the Internet such as sending a document by mail or facsimile. The system according to the present invention is not limited to a particular method for an end user to convey a desired specification to a resource server. The end user needs not to have expertise of communication technology and needs only to convey self desire to an administrator of the resource server by using dally terms.

The administrator of the resource server or a carrier which provides a specification to the set-top box creates the specification 1 according to a desire from the end user of the set-top box. An actual example of the specification 1 is shown in FIG. 8. The created specification 1 and a distribution ID of the get-top box are inputted to the resource server through a specification inputting interface of the resource server. The pieces of data inputted into the resource server are sent to a specification analyzing device (actually, implemented as software) and analyzed its specification by the specification analyzing device. The specification analyzing device analyzes the specification for defining a service desired by the end user, and creates "functions" required for providing the service and "configurations" required for casing the functions to actually operate in the set-top box of the end user.

FIG. 8 shows the detailed specification analyses. As mentioned above, the specification 1 is for causing the set-top box to operate also as a web browse terminal. It is assumed that a distribution ID is by Corporation A for the set top box for using the line. Web browsing is realized by a plurality of staged functions of connecting to the Internet by using the line from Corporation A as a first process, accessing the Internet by using A browser from Corporation B, for example, with an inputting device such as a remote controller as a second process, and outputting a result of accessing with a browser to the device 1 (display) or the device 2 (speaker) as a third process. Modules required for the first process needs to have a function of terminating the line from Corporation A and a function of configuring a line account (access account) of Corporation A. Modules required fox the second process needs a web browser function from Corporation B and a web browser configuration function from Corporation B The third process needs controlling functions end configurations for each of the devices 1 and 2. The specification analyzing advice discloses that a specification for defining a service which the end user using a set-top box wants to realize in the set-top box at home is formed by a plurality of functional modules. The resource server registers such an analyzed result in a virtual service adapter database. A group of functional modules in the virtual service adapter database are distinguished by a distribution ID of the set-top box.

In such a manner, a virtual service adapter corresponding to a specification desired by a particular end user is created in the resource server. The virtual service adapter is actually data registered on a database and mainly formed by the next two pieces of information. That is to say, first, it a distribution ID, and second, a list of functional modules indicating what kind of functional modules form the virtual service adapter.

(3-4) Startup of Set-Top Box and Acquisition of Module Information:

When an end user turns on power of a set-top box, base firmware starts its operation in the set-top box. The base firmware starts AIMS client software as a part of start processing. The ARMS client software accesses the location server by using access information to the location server in the set-top box. First it creates a condition in which it can use the Internet line by using account information for using the Internet line and a network line connecting function of the base firmware. In the condition, it connects to the location server based on the location information of the location server. The ARMS client software informs the location server of the distribution ID. The location server searches database by using the informed distribution ID, and informs the ARMS client software of access information to the resource serer.

The set-top box connects to the resource server by using resource server access information. The ARMS client software informs the resource server of the distribution ID. The resource server searches virtual service adapter information by using the informed distribution ID, and informs the ARMS client software of module information. The ARMS client software passes the module information received from the resource server to the Add-On client software.

(3-5) Generating Software Package in the Set-Top Box:

FIG. 10 shows a case where a software package is generated in a set-top box. The Add-On client software included in the set-top box interprets the module information received from the resource server and acquires software parts corresponding to the module information if required. Additional software may or may not be required for implementing the "functions" included in the module information. Therefore, it does not necessarily acquire new software parts.

The Add-On client software performs the same operation for all pieces of module information passed from the ARMS client and collects parts necessary for operations of all the modules. Next, it assembles the parts to be in a condition which can operate as a software package. When it assembles parts, it takes account of interference between parts, a using condition of a hardware resource in the set-top box and the like.

The software package created in the abovementioned procedure will provide functions equivalent to the virtual service adapter. That is to say, it is a software package in which the virtual service adapter acquired as a result of analyzing a specification by the specification analyzing device in the resource server provides a service reproduced in the set-top box which in a physical service adapter at home or the like of the end user and defined by the specification 1 for an end user.

At the moment when the end user issues a request, the set-top box is formed only by the base firmware, the ARMS client software, and the Add-On client software. Such a set-top box is remade into the set-top box which can provide a service based on the specification 1 for a user by going through addition and reconfiguration of software by the abovementioned procedures. In the system according to the present invention, the operation is also referred to as a service adapter automatic generation (SA Auto Generation).

Inside the set-top box which succeeded in automatic generation of the service adapter, the ARMS client software keeps operating in an operation state. The ARMS client software in an operation state informs the resource server of its operation condition. The informed contents include the operation condition such as a resource using ratio and the location information of the set-top box. The resource server recognized an operation condition of the set-top box by saving the information received from the ARMS client software, and enters in a state accessible to the set-top box by using the location information if required. The information can be regularly performed by a predetermined time interval, which enables a record relating to an operation condition of the set-top box saved in the resource server to be always kept in the latest state.

If the ARMS client software fails in informing the operation condition, it detects that it is in a state where it cannot synchronize with the resource server. If it stays in the state long, a gap may occur between the set-top box and the virtual service adapter. If it is determined that it may occur, i.e., if the failure is kept long, the ARMS client software inquires a resource server about module information again to compensate the gap. As such, the ARMS client software in an operational state always operates to synchronize specifications of the virtual service adapter and the set-top box. Accordingly, even if communication failure or the like occurs, a gap in specifications which may occur between a virtual service adapter and a set-top box is automatically compensated.

(3-6) Changing a Specification in a Set-Top Box:

Next, a case where an end user wants to charge a set-top box, which is used as a web browse terminal at the moment, into the specification of the Internet television telephone will be considered. Although the specification 1 as the web browse terminal is inputted through a specification inputting unit of the resource server is shown. In previously referenced FIG. 7, the specification 2 such as the Internet television telephone will be newly inputted for this time. When a provider of a set-top box receives a request from an end user, it inputs the specification of the Internet television telephone (specification 2) into a resource server through a specification inputting interface. When the specification 2, is inputted, the resource server changes a virtual service adapter in the same procedure as in the abovementioned specification 1. Because the virtual service adapter having the same distribution ID has been present in a virtual service adapter database, this task is to change a virtual service adapter instead of newly creating a virtual service adapter.

FIG. 11 shows a case where the specification 2 of the Internet television telephone is analyzed and a group of functional modules is created. In order to implement a service of the Internet television telephone, first, it is needed to connect to the Internet by using a line of a provider (Corporation C) of VoIP (Voice over IP) for implementing a voice call over an IP network; second, make a phone call according to an input from a remote controller of a set-top box; third, input a self image from a device 5 (camera), input a self voice from a device 3 (microphone), output the other party's image on a device 1 (display), and output the other party's voice to a device 2 (speaker). The functional module corresponding to them is shown in FIG. 11.

(3-7) Informing of Changing a Specification to a Set-Top Box

Figure 7:
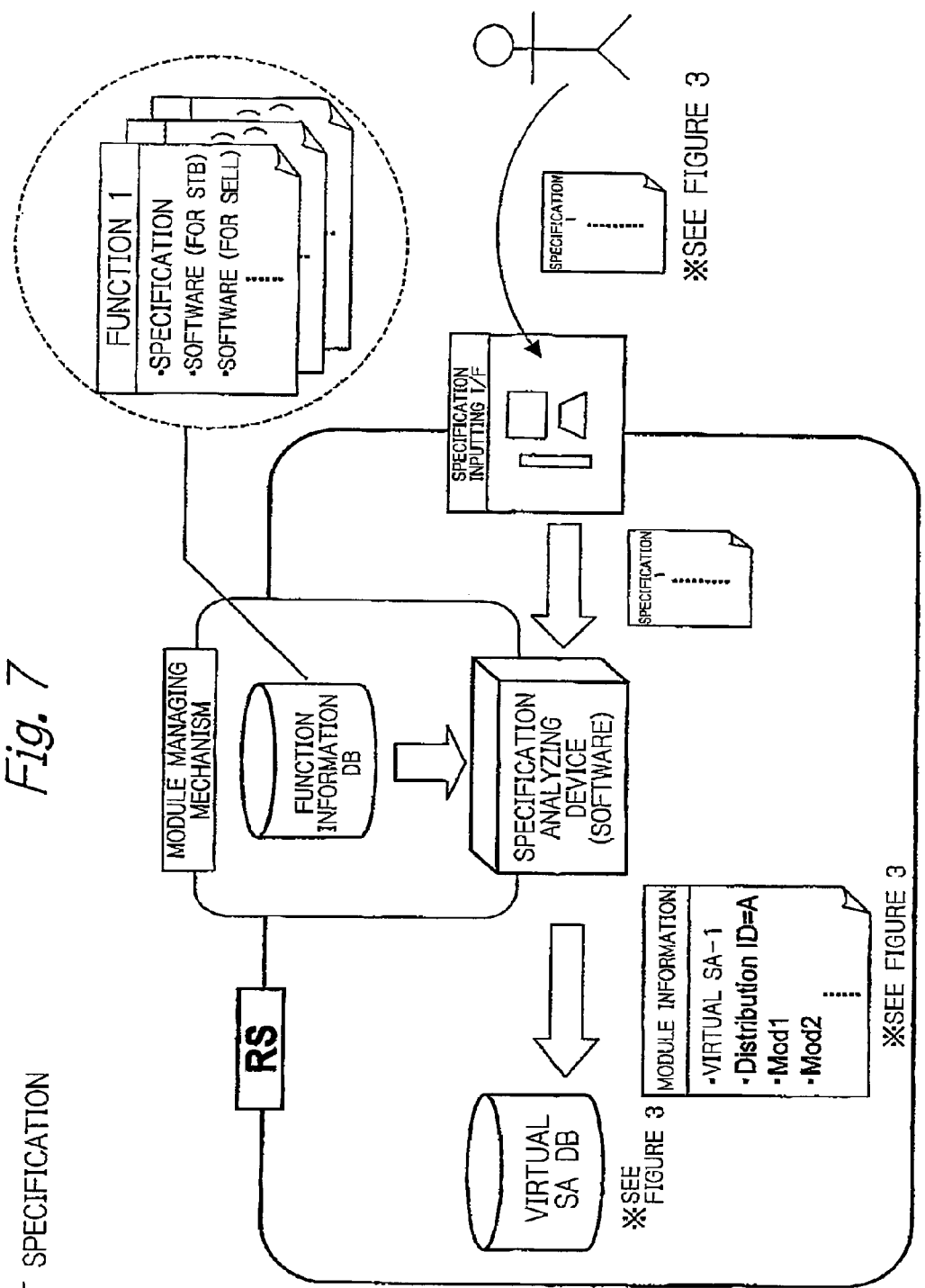
FIG. 7 shows an aspect of inputting a specification into the resource server.

Next FIG. 7 shows a case where communication necessary to change a specification between a resource server and a set-top box is performed. When a virtual service adapter is changed, the resource server informs the ARMS client software, which operates in the set top box, of the contents to be changed by using a distribution ID. That information is possible as the resource server saves place information informed from the ARMS client software in operation state.

The contents to be changed are represented as module information as it is done at startup. If the contents to be changed vary, only a message indicating that there was a change may be informed of and processing corresponding to startup may be performed again. Whichever process is taken, the ARMS client software finally acquires module information corresponding to the specification 2. The ARMS client software acquired the module information passes the module information to the Add-On client software.

(3-8) Implementing the Specification 2 in a Set-Top Box:

FIG. 12 and FIG. 13 show cases where a software package corresponding to the specification 2 is automatically generated in a set-top box. The Add-On client software interprets the module information passed from the ARMS client software, deletes software parts relating to unwanted module information, and acquires newly needed software parts. The parts without any change are used as they are.

Next, a software package is generated by the same operation as it is done at startup. The software package provides a service corresponding to the specification 2 in the set-top box.

(3-9) Outline of Differences from the Version 1:

In the system according to the present invention (version 2), as module information can be arbitrarily added, it can flexibly accommodate even a device which is unknown at present but can be used in future as a device 6 in FIG. 7. By selecting an appropriate module based on specification information inputted at some moment, the set-top box can always provide a service based on the latest specification with the minimum resource. Even if a device is not added, a new service can also be provided by combining existing devices in another aspect.

In the system according to the present invention, the resource of the set-top box can be efficiently used by deleting unwanted parts at updating the specification. For example, it is assumed that four functional modules (from mod1 to mod4) are needed before updating the specification and six functional modules (from mod3 to mod8) are needed after updating the specification. Here, from mod3 to mod4 are assumed to be needed both before and after the updating. In the system according to the present invention, mod1 and mod2, which become unwanted by updating, are deleted at the updating. That is to say, the system according to the present invention eliminates the need for keeping all the eight functional modules from mod1 to mod8 which are needed to be kept in conventional art. That parts can be deleted end added at updating corresponds to that a part of conventional firmware (version 1) is rewritten without restart. Conventionally, no method has been existed except for that for rewriting the entire of the firmware, thus, even restarting is necessary. The system according to the present invention is quite different from the version 1 in that point. Conventionally, no method has been existed except for that for providing firmware which provides both the specification 1 and the specification 2 at the same time. That is sometimes impossible due to restriction on the resource of the set-top box. In the system according to the present invention, a new configuration widens the possibility.

As described above, in the system according to the present invention, the degree of whether a service can be provided or not depending or a resource of a network terminal, which is exemplified by a set-top box, can be minimized when the service is provided at the network terminal. An it is not limited to a particular network terminal, a service can be provided at various network terminals in a quite wide range. These days, various kinds of home electric appliances with a function of connecting to the Internet exist. In the system according to the present invention, not only a set-top box but also a home electric appliance in an environment of connecting to the Internet can be used as a physical service adapter. From a viewpoint of an end user, it means that no restriction is imposed by the model or the type of network terminal used by the end user in the system according to the present invention. That is to say, the end user can use desired service at the end user's network terminal by joining in the network terminal management system according to the present invention even if a particular network terminal is used. Therefore, by using the system according to the present invention, the end use needs not to purchase particular hardware or software anew each time the user wants to get a particular new service.

An aspect in which the Internet is used is primarily different among organizations or individuals. The Internet has been widespread so far because it has so strong flexibility as not to be limited by particular hardware or software. Independence on a particular model, i.e., versatility of the present invention is highly coherent with the strong flexibility of the Internet. For example, as a special function which operates only in a particular game machine is considered, superiority of the present invention is apparent.

As mentioned above, in the system according to the present invention, restriction is required little for a network terminal and a communication line is not limited to a particular one. That is to say, the system according to the present invention only provides a system described in the attached claims of the application between communication lines and terminals of various kinds. With outstanding versatility of the system according to the present invention, if an end user wants to get a certain service at a network terminal connected to a line, an outstanding economical effect is also expected such that it costs as little as possible for an end user, a communication carrier, a terminal appliance manufacturer, and a service provider. It enables an end user to easily use various services by minimum cost. It also enables a communication carrier, a terminal appliance manufacturer, and a service provider to expect a considerable economical effect as a whole because of a large number of wide ranged end users even if sales are quite small for each user. The system according to the present invention also has an outstanding economical effect as mentioned above.

What is claimed is:

1. A system for managing a plurality of network connecting appliances comprising:

first and second servers which can be connected to said plurality of network connecting appliances via a network;

a first database which is connected to said first server and stores relationship between an identifier of each of said plurality of network connecting appliances and the second server responsible for the network connecting appliance;

a second database which is connected to said second server and stores configuration data to be provided for each of said plurality of network connecting appliances such that the configuration data can be retrieved by using an identifier of the network connecting appliance; and a third database which is connected to said second server and stores function data to be provided for each of said plurality of network connecting appliances such that the function data can be retrieved by using an identifier of the network connecting appliance, wherein (a) each of said plurality of network connecting appliances comprises:

first storage means for storing first connection data required for connecting to said first server;

means for automatically sending an identifier of the network connecting appliance to said first server by using said first connection data stored in said first storage means in response to power being turned on;

means for sending an identifier of the network connecting appliance to said second server by using a received second connection data when second connection data required for connecting to said second server, which is responsible for the network connecting appliances is received from said first server;

means for automatically configuring the network connecting appliance by using said configuration data when the configuration data is received from said second server; and means for implementing a virtual function included in said function data as a physical function in the network connecting appliance by using said function data when the function data is received from said second server;

(b) said first server comprises:

means for receiving an identifier from each of said plurality of network connecting appliances;

means for acquiring the second connection data required for connecting to the second server responsible for a network connecting appliance identified by using the received identifier from said first database; and means for sending said acquired second connection data to the network connecting appliance that has sent the identifier, and (c) said second server comprises:

means for receiving an identifier from each of said plurality of network connecting appliances;

means for acquiring configuration data to be provided for a network connecting appliance identified by using the received identifier from said second database;

means for acquiring function data to be provided for a network connecting appliance identified by using the received identifier from said third database; and means for sending configuration data acquired from said second database and function data acquired from said third database to the network connecting appliance that has sent the identifier, wherein said second server further comprises:

a fourth database storing a functional module which can be provided for said plurality of network connecting appliances, specification updating interface means for updating a specification for defining a service to be implemented in a particular network connecting appliance in said plurality of network connecting appliances, and specification analyzing means for analyzing an updated new specification by using said specification updating interface means, acquiring all the functional modules for forming said new specification from said fourth database, and updating function data to be provided for the particular network connecting appliance stored in said third database by using the function data formed by the acquired functional modules.

2. The system according to claim 1, wherein each of said plurality of network connecting appliances further comprises means for synchronizing function data which is physically implemented in the network connecting appliances and function data stored in said third database as a virtual function as to be provided in the network connecting appliance and physically implemented.

3. The system according to claims 1 or 2, wherein said second server further comprises;

configuration updating interface means for updating configuration of a particular network connecting appliance in said plurality of network connecting appliances; and means for reflecting new configuration updated by using said configuration updating interface means to configuration data which is provided for the network connecting appliance stored in said second database.

4. The system according to claims 1 or 2, further comprising updated data sending means for sending at least one of configuration data of said plurality of network connecting appliances stored in said second database and function data of said plurality of network connecting appliances stored in said third database to said plurality of network connecting appliances in a push type manner at any timing without regard of the presence of access from said plurality of network connecting appliances.

5. The system according to claims 1 or 2, wherein each of said plurality of network connecting appliances further comprises second storage means for storing second connection data which is required for connecting to the second server responsible for the network connecting appliance; and wherein, if configuration data and function data are sent from said second server and at least a network connecting appliance of said plurality of network connecting appliances is tuned off and then needs to be turned on again, the network connecting appliance which is turned on again can use the second connection data stored in said second storage means without acquiring the second connection data for connecting to the second server which is responsible for the network connecting appliance from said first server again.

6. The system according to claim 2, wherein said second server further comprises:

configuration updating interface means for updating configuration of a particular network connecting appliance in said plurality of network connecting appliances, and means for reflecting new configuration updated by using said configuration updating interface means to configuration data which is provided for the network connecting appliance stored in said second database; and further comprising updated data sending means for sending at least one of configuration data of said plurality of network connecting appliances stored in said second database and function data of said plurality of network connecting appliances stored in said third database to said plurality of network connecting appliances in a push type manner at any timing without regard of the presence of access from said plurality of network connecting appliances.

7. The system according to claim 2, wherein said second server further comprises:

configuration updating interface means for updating configuration of a particular network connecting appliance in said plurality of network connecting appliances, and means for reflecting new configuration updated by using said configuration updating interface means to configuration data which is provided for the network connecting appliance stored in said second database;

wherein each of said plurality of network connecting appliances further comprises second storage means for storing second connection data which is required for connecting to the second server responsible for the network connecting appliance; and wherein, if configuration data and function data are sent from said second server and at least a network connecting appliance of said plurality of network connecting appliances is tuned off and then needs to be turned on again, the network connecting appliance which is turned on again can use the second connection data stored in said second storage means without acquiring the second connection data for connecting to the second server which is responsible for the network connecting appliance from said first server again.

8. The system according to claim 2,
further comprising updated data sending means for sending at least one of configuration data of said plurality of network connecting appliances stored in said second database and function data of said plurality of network connecting appliances stored in said third database to said plurality of network connecting appliances in a push type manner at any timing without regard of the presence of access from said plurality of network connecting appliances;
wherein each of said plurality of network connecting appliances further comprises second storage means for storing second connection data which is required for connecting to the second server responsible for the network connecting appliance; and
wherein, if configuration data and function data are sent from said second server and at least a network connecting appliance of said plurality of network connecting appliances is tuned off and then needs to be turned on again, the network connecting appliance which is turned on again can use the second connection data stored in said second storage means without acquiring the second connection data for connecting to the second server which is responsible for the network connecting appliance from said first server again.

9. The system according to claim 2,
wherein said second server further comprises:
  configuration updating interface means for updating configuration of a particular network connecting appliance in said plurality of network connecting appliances, and
  means for reflecting new configuration updated by using said configuration updating interface means to configuration data which is provided for the network connecting appliance stored in said second database;
further comprising updated data sending means for sending at least one of configuration data of said plurality of network connecting appliances stored in said second database and function data of said plurality of network connecting appliances stored in said third database to said plurality of network connecting appliances in a push type manner at any timing without regard of the presence of access from said plurality of network connecting appliances;
wherein each of said plurality of network connecting appliances further comprises second storage means for storing second connection data which is required for connecting to the second server responsible for the network connecting appliance; and
wherein, if configuration data and function data are sent from said second server and at least a network connecting appliance of said plurality of network connecting appliances is tuned off and then needs to be turned on again, the network connecting appliance which is turned on again can use the second connection data stored in said second storage means without acquiring the second connection data for connecting to the second server which is responsible for the network connecting appliance from said first server again.

10. The system according to claim 1,
wherein said second server further comprises:
  configuration updating interface means for updating configuration of a particular network connecting appliance in said plurality of network connecting appliances, and
  means for reflecting new configuration updated by using said configuration updating interface means to configuration data which is provided for the network connecting appliance stored in said second database; and
further comprising updated data sending means for sending at least one of configuration data of said plurality of network connecting appliances stored in said second database and function data of said plurality of network connecting appliances stored in said third database to said plurality of network connecting appliances in a push type manner at any timing without regard of the presence of access from said plurality of network connecting appliances.

11. The system according to claim 1,
wherein said second server further comprises:
  configuration updating interface means for updating configuration of a particular network connecting appliance in said plurality of network connecting appliances, and
  means for reflecting new configuration updated by using said configuration updating interface means to configuration data which is provided for the network connecting appliance stored in said second database;
wherein each of said plurality of network connecting appliances further comprises second storage means for storing second connection data which is required for connecting to the second server responsible for the network connecting appliance; and
wherein, if configuration data and function data are sent from said second server and at least a network connecting appliance of said plurality of network connecting appliances is tuned off and then needs to be turned on again, the network connecting appliance which is turned on again can use the second connection data stored in said second storage means without acquiring the second connection data for connecting to the second server which is responsible for the network connecting appliance from said first server again.

12. The system according to claim 1,
further comprising updated data sending means for sending at least one of configuration data of said plurality of network connecting appliances stored in said second database and function data of said plurality of network connecting appliances stored in said third database to said plurality of network connecting appliances in a push type manner at any timing without regard of the presence of access from said plurality of network connecting appliances;
wherein each of said plurality of network connecting appliances further comprises second storage means for storing second connection data which is required for connecting to the second server responsible for the network connecting appliance; and
wherein, if configuration data and function data are sent from said second server and at least a network connecting appliance of said plurality of network connecting appliances is tuned off and then needs to be turned on again, the network connecting appliance which is turned on again can use the second connection data stored in said second storage means without acquiring the second connection data for connecting to the second server which is responsible for the network connecting appliance from said first server again.

13. The system according to claim 1,
wherein said second server further comprises:
configuration updating interface means for updating configuration of a particular network connecting appliance in said plurality of network connecting appliances, and
means for reflecting new configuration updated by using said configuration updating interface means to configuration data which is provided for the network connecting appliance stored in said second database;
further comprising updated data sending means for sending at least one of configuration data of said plurality of network connecting appliances stored in said second database and function data of said plurality of network connecting appliances stored in said third database to said plurality of network connecting appliances in a push type manner at any timing without regard of the presence of access from said plurality of network connecting appliances;
wherein each of said plurality of network connecting appliances further comprises second storage means for storing second connection data which is required for connecting to the second server responsible for the network connecting appliance; and
wherein, if configuration data and function data are sent from said second server and at least a network connecting appliance of said plurality of network connecting appliances is tuned off and then needs to be turned on again, the network connecting appliance which is turned on again can use the second connection data stored in said second storage means without acquiring the second connection data for connecting to the second server which is responsible for the network connecting appliance from said first server again.

14. A method for controlling a system for managing a plurality of network connecting appliances, said system comprising first and second servers which can be connected to said plurality of network connecting appliances via a network; a first database which is connected to said first server and stores relationship between an identifier of each of said plurality of network connecting appliances and the second server responsible for the network connecting appliance; a second database which is connected to said second server and stores configuration data to be provided for each of said plurality of network connecting appliances such that the configuration data can be retrieved by using an identifier of the network connecting appliance; and a third database which is connected to said second server and stores function data to be provided for each of said plurality of network connecting appliances such that the function data can be retrieved by using an identifier of the network connecting appliance, wherein said method comprises the steps of:

(1) each of said plurality of network connecting appliances, in response to power being turned on, automatically acquiring first connection data required for connecting to said first server from a first storage means storing said first connection data and sending an identifier of the network connecting appliance to said first server by using said first connection data;

(2) said first server receiving an identifier from each of said plurality of network connecting appliances;

(3) said first server acquiring second connection data required for connecting to the second server responsible for the network connecting appliance identified by using the received identifier front said first database;

(4) said first server sending said acquired second connection data to the network connecting appliance that has sent the identifier;

(5) each of said plurality of network connecting appliances, in response to receiving second connection data required for connecting to said second server responsible for the network connecting appliance from said first server, sending an identifier of the network connecting appliance to said second server by using the received second connection data;

(6) said second server receiving identifiers from each of said plurality of network connecting appliances, (7) said second server acquiring configuration data to be provided for a network connecting appliance identified by using the received identifier from said second database;

(8) said second server acquiring function data to be provided for a network connecting appliance identified by using the received identifier from said third database;

(9) said second server sending configuration data acquired from said second database and function data acquired from said third database to the network connecting appliance that has sent the identifier; and

(10) the network connecting appliance that has sent said identifier, in response to receiving configuration data and function date from said second server, automatically configuring the network connecting appliance by using said configuration data, and implementing a virtual function included in said function data as a physical function in the network connecting appliance by using said function data, wherein said second server further comprises a fourth database storing a functional module which can be provided for said plurality of network connecting appliances, and said method further comprises the steps of:
updating a specification for defining a service to be implemented in a particular network connecting appliance in said plurality of network connecting appliances by using specification updating interface, and
analyzing a new specification updated by using said specification updating interface means by using specification analyzing means, acquiring all the functional modules for forming said new specification from said fourth database, and updating function data to be provided for the particular network connecting appliance stored in said third database by using the function data formed by the acquired functional modules.

15. The method according to claim 14, wherein each of said plurality of network connecting appliances further comprises a step for synchronizing function data which is physically implemented in the network connecting appliances and function data stored in said third database as a virtual function as to be provided in the network connecting appliance and physically implemented.

16. The method according to claims 14 or 15, further comprising a step of:
said second server reflecting configuration updated data inputted via configuration updating interface means to configuration data to be provided for the network connecting appliance stored in said second database.

17. The method according to claims 14 or 15, further comprising a step of:
said second server sending at least either of configuration data of said plurality of network connecting appliances stored in said second database and function data of said plurality of network connecting appliances stored in said third database to said plurality of network connecting appliances in a push type aspect at any timing without regard of the presence of access from said plurality of network connecting appliances means.

18. The method according to any of claims 14 or 15, wherein each of said plurality of network connecting appliances further comprises second storage means for storing second connection data which is required for connecting to the second server responsible for the network connecting appliance; and
wherein, if configuration data and function data are sent from said second server and at least a network connecting appliance of said plurality of network connecting appliances is tuned off and then needs to be turned on again, the network connecting appliance which is turned on again can use the second connection data stored in said second storage means without needing to acquire the second connection data for connecting to the second server responsible for the network connecting appliance from said first server again.

19. The method according to claim 15, further comprising steps of:
said second server reflecting configuration updated data inputted via configuration updating interface means to configuration data to be provided for the network connecting appliance stored in said second database, and
said second server sending at least either of configuration data of said plurality of network connecting appliances stored in said second database and function data of said plurality of network connecting appliances stored in said third database to said plurality of network connecting appliances in a push type aspect at any timing without regard of the presence of access from said plurality of network connecting appliances means.

20. The method according to claim 15,
further comprising a step of said second server reflecting configuration updated data inputted via configuration updating interface means to configuration data to be provided for the network connecting appliance stored in said second database,
wherein each of said plurality of network connecting appliances further comprises second storage means for storing second connection data which is required for connecting to the second server responsible for the network connecting appliance, and
wherein, if configuration data and function data are sent from said second server and at least a network connecting appliance of said plurality of network connecting appliances is tuned off and then needs to be turned on again, the network connecting appliance which is turned on again can use the second connection data stored in said second storage means without needing to acquire the second connection data for connecting to the second server responsible for the network connecting appliance from said first server again.

21. The method according to claim 15,
further comprising a step of said second server sending at least either of configuration data of said plurality of network connecting appliances stored in said second database and function data of said plurality of network connecting appliances stored in said third database to said plurality of network connecting appliances in a push type aspect at any timing without regard of the presence of access from said plurality of network connecting appliances means,
wherein each of said plurality of network connecting appliances further comprises second storage means for storing second connection data which is required for connecting to the second server responsible for the network connecting appliance, and
wherein, if configuration data and function data are sent from said second server and at least a network connecting appliance of said plurality of network connecting appliances is tuned off and then needs to be turned on again, the network connecting appliance which is turned on again can use the second connection data stored in said second storage means without needing to acquire the second connection data for connecting to the second server responsible for the network connecting appliance from said first server again.

22. The method according to claim 15,
further comprising a step of said second server reflecting configuration updated data inputted via configuration updating interface means to configuration data to be provided for the network connecting appliance stored in said second database,
further comprising a step of said second server sending at least either of configuration data of said plurality of network connecting appliances stored in said second database and function data of said plurality of network connecting appliances stored in said third database to said plurality of network connecting appliances in a push type aspect at any timing without regard of the presence of access from said plurality of network connecting appliances means,
wherein each of said plurality of network connecting appliances further comprises second storage means for storing second connection data which is required for connecting to the second server responsible for the network connecting appliance, and
wherein, if configuration data and function data are sent from said second server and at least a network connecting appliance of said plurality of network connecting appliances is tuned off and then needs to be turned on again, the network connecting appliance which is turned on again can use the second connection data stored in said second storage means without needing to acquire the second connection data for connecting to the second server responsible for the network connecting appliance from said first server again.

23. The method according to claim 14, further comprising steps of:
said second server reflecting configuration updated data inputted via configuration updating interface means to configuration data to be provided for the network connecting appliance stored in said second database, and
said second server sending at least either of configuration data of said plurality of network connecting appliances stored in said second database and function data of said plurality of network connecting appliances stored in said third database to said plurality of network connecting appliances in a push type aspect at any timing without regard of the presence of access from said plurality of network connecting appliances means.

24. The method according to claim 14,
further comprising a step of said second server reflecting configuration updated data inputted via configuration updating interface means to configuration data to be provided for the network connecting appliance stored in said second database, wherein each of said plurality of network connecting appliances further comprises second storage means for storing second connection data which is required for connecting to the second server responsible for the network connecting appliance, and wherein, if configuration data and function data are sent from said second server and at least a network connecting appliance of said plurality of network connecting appliances is tuned off and then needs to be turned on again, the network connecting appliance which is turned on again can use the second connection data stored in said second storage means without needing to acquire the second connection data for connecting to the second server responsible for the network connecting appliance from said first server again.

25. The method according to claim 14, further comprising a step of said second server sending at least either of configuration data of said plurality of network connecting appliances stored in said second database and function data of said plurality of network connecting appliances stored in said third database to said plurality of network connecting appliances in a push type aspect at any timing without regard of the presence of access from said plurality of network connecting appliances means, wherein each of said plurality of network connecting appliances further comprises second storage means for storing second connection data which is required for connecting to the second server responsible for the network connecting appliance, and wherein, if configuration data and function data are sent from said second server and at least a network connecting appliance of said plurality of network connecting appliances is tuned off and then needs to be turned on again, the network connecting appliance which is turned on again can use the second connection data stored in said second storage means without needing to acquire the second connection data for connecting to the second server responsible for the network connecting appliance from said first server again.

26. The method according to claim 14, further comprising a step of said second server reflecting configuration updated data inputted via configuration updating interface means to configuration data to be provided for the network connecting appliance stored in said second database, further comprising a step of said second server sending at least either of configuration data of said plurality of network connecting appliances stored in said second database and function data of said plurality of network connecting appliances stored in said third database to said plurality of network connecting appliances in a push type aspect at any timing without regard of the presence of access from said plurality of network connecting appliances means, wherein each of said plurality of network connecting appliances further comprises second storage means for storing second connection data which is required for connecting to the second server responsible for the network connecting appliance, and wherein, if configuration data and function data are sent from said second server and at least a network connecting appliance of said plurality of network connecting appliances is tuned off and then needs to be turned on again, the network connecting appliance which is turned on again can use the second connection data stored in said second storage means without needing to acquire the second connection data for connecting to the second server responsible for the network connecting appliance from said first server again.

27. A computer readable storage medium storing a program for controlling a system for managing a plurality of network connecting appliances, said system comprising first and second servers which can be connected to said plurality of network connecting appliances via a network; a first database which is connected to said first server and stores relationship between an identifier of each of said plurality of network connecting appliances and the second server responsible for the network connecting appliance; a second database which is connected to said second server and stores configuration data to be provided for each of said plurality of network connecting appliances such that the configuration data can be retrieved by using an identifier of the network connecting appliance; and a third database which is connected to said second server and stores function data to be provided for each of said plurality of network connecting appliances such that the function data can be retrieved by using an identifier of the network connecting appliance, the computer readable storage medium storing the program for having a computer execute the following steps:

(1) each of said plurality of network connecting appliances, in response to power being turned on, automatically acquiring first connection data required for connecting to said first server from a first storage means storing said first connection data and sending an identifier of the network connecting appliance to said first server by using said first connection data;

(2) said first server receiving an identifier from each of said plurality of network connecting appliances;

(3) said first server acquiring second connection data required for connecting to the second server responsible for the network connecting appliance identified by using the received identifier front said first database;

(4) said first server sending said acquired second connection data to the network connecting appliance that has sent the identifier;

(5) each of said plurality of network connecting appliances, in response to receiving second connection data required for connecting to said second server responsible for the network connecting appliance from said first server, sending an identifier of the network connecting appliance to said second server by using the received second connection data;

(6) said second server receiving identifiers from each of said plurality of network connecting appliances, (7) said second server acquiring configuration data to be provided for a network connecting appliance identified by using the received identifier from said second database;

(8) said second server acquiring function data to be provided for a network connecting appliance identified by using the received identifier from said third database;

(9) said second server sending configuration data acquired from said second database and function data acquired from said third database to the network connecting appliance that has sent the identifier; and

(10) the network connecting appliance that has sent said identifier, in response to receiving configuration data and function date from said second server, automatically configuring the network connecting appliance by using said configuration data, and implementing a virtual function included in said function data as a physical function in the network connecting appliance by using said function data, wherein said second server further comprises a fourth database storing a functional module which can be provided for said plurality of network connecting appliances, and said program stored on said computer readable storage medium causing the computer further execute the following steps:

updating a specification for defining a service to be implemented in a particular network connecting appliance in said plurality of network connecting appliances by using specification updating interface, and analyzing a new specification updated by using said specification updating interface means by using specification analyzing means, acquiring all the functional modules for forming said new specification from said fourth database, and updating function data to be provided for the particular network connecting appliance stored in said third database by using the function data formed by the acquired functional modules.

* * * * *